United States Patent
Riesebosch

(10) Patent No.: US 8,432,088 B2
(45) Date of Patent: Apr. 30, 2013

(54) PERMANENT CONVERSION ADAPTER FOR LIGHTING FIXTURES

(75) Inventor: Scott Riesebosch, St. Catharines (CA)

(73) Assignee: CRS Electronics, Welland, CA (US)

( * ) Notice: Subject to any disclaimer, the term of this patent is extended or adjusted under 35 U.S.C. 154(b) by 39 days.

(21) Appl. No.: 12/983,623

(22) Filed: Jan. 3, 2011

(65) Prior Publication Data

US 2012/0171881 A1    Jul. 5, 2012

(51) Int. Cl.
*H01J 1/02*    (2006.01)
(52) U.S. Cl.
USPC .................. 313/46; 445/22; 362/800
(58) Field of Classification Search ............ 313/512, 313/46; 362/800, 294, 373, 126, 345; 445/22
See application file for complete search history.

(56) References Cited

U.S. PATENT DOCUMENTS

| | | |
|---|---|---|
| 3,951,487 A | 4/1976 | Waldbrook |
| 4,807,099 A | 2/1989 | Zelin |
| 4,969,833 A | 11/1990 | Lindow et al. |
| 5,230,641 A | 7/1993 | Wharton |
| 5,286,216 A | 2/1994 | Volz |
| 5,388,357 A | 2/1995 | Malita |
| 5,409,398 A | 4/1995 | Chadbourne et al. |
| 5,416,679 A | 5/1995 | Ruskouski et al. |
| 5,442,258 A | 8/1995 | Shibata |
| 5,459,955 A | 10/1995 | Ruskouski et al. |
| 5,463,280 A | 10/1995 | Johnson |
| 5,526,236 A | 6/1996 | Burnes et al. |
| 5,577,832 A | 11/1996 | Lodhie |
| 5,688,042 A | 11/1997 | Madadi et al. |
| 5,726,535 A | 3/1998 | Yan |
| 5,949,347 A | 9/1999 | Wu |
| 6,036,336 A | 3/2000 | Wu |
| 6,171,129 B1 | 1/2001 | Phillips |
| 6,190,199 B1 | 2/2001 | Bump et al. |
| 6,206,714 B1 | 3/2001 | Bernardini |
| 6,338,647 B1 | 1/2002 | Fernandez et al. |
| 6,416,362 B1 | 7/2002 | Conrad et al. |
| 6,699,058 B1 | 3/2004 | Estrela et al. |
| 6,739,734 B1 | 5/2004 | Hulgan |
| 7,004,595 B1 | 2/2006 | Stoddard |
| 7,238,061 B1 | 7/2007 | Lin |
| 7,458,934 B2 | 12/2008 | Roberts et al. |
| 7,510,299 B2 | 3/2009 | Timmermans et al. |
| 2003/0076051 A1 | 4/2003 | Bowman et al. |
| 2004/0012959 A1 | 1/2004 | Robertson et al. |
| 2004/0066142 A1 | 4/2004 | Stimac et al. |
| 2004/0189218 A1 | 9/2004 | Leong et al. |
| 2005/0169015 A1 | 8/2005 | Luk et al. |
| 2006/0039159 A1 | 2/2006 | Grote et al. |
| 2006/0044789 A1 | 3/2006 | Curtis |
| 2006/0262533 A1 | 11/2006 | Lin et al. |
| 2007/0008723 A1 | 1/2007 | Hampton |
| 2007/0228999 A1 | 10/2007 | Kit |
| 2007/0242461 A1 | 10/2007 | Reisenauer et al. |
| 2007/0251712 A1 | 11/2007 | Berg et al. |
| 2007/0254512 A1 | 11/2007 | Bin |
| 2007/0267976 A1 | 11/2007 | Bohler et al. |
| 2008/0278955 A1 | 11/2008 | Boyer |
| 2008/0304219 A1 | 12/2008 | Chen |
| 2009/0086481 A1 | 4/2009 | Wegner |

FOREIGN PATENT DOCUMENTS

| | | |
|---|---|---|
| JP | 2004045939 | 2/2004 |
| JP | 2006048934 | 2/2006 |
| WO | WO 03060495 | 7/2003 |
| WO | WO 2005103555 | 11/2005 |
| WO | WO 2006001032 | 1/2006 |
| WO | WO 2007120501 | 10/2007 |
| WO | WO 2008049324 | 5/2008 |
| WO | WO 2009026213 | 2/2009 |
| WO | WO 2009046186 | 4/2009 |

*Primary Examiner* — Anne Hines
(74) *Attorney, Agent, or Firm* — Bingham McCutchen LLP

(57) ABSTRACT

A permanent adapter for incandescent lighting fixtures can removably receive LEDs but cannot itself be removed from the fixture.

27 Claims, 5 Drawing Sheets

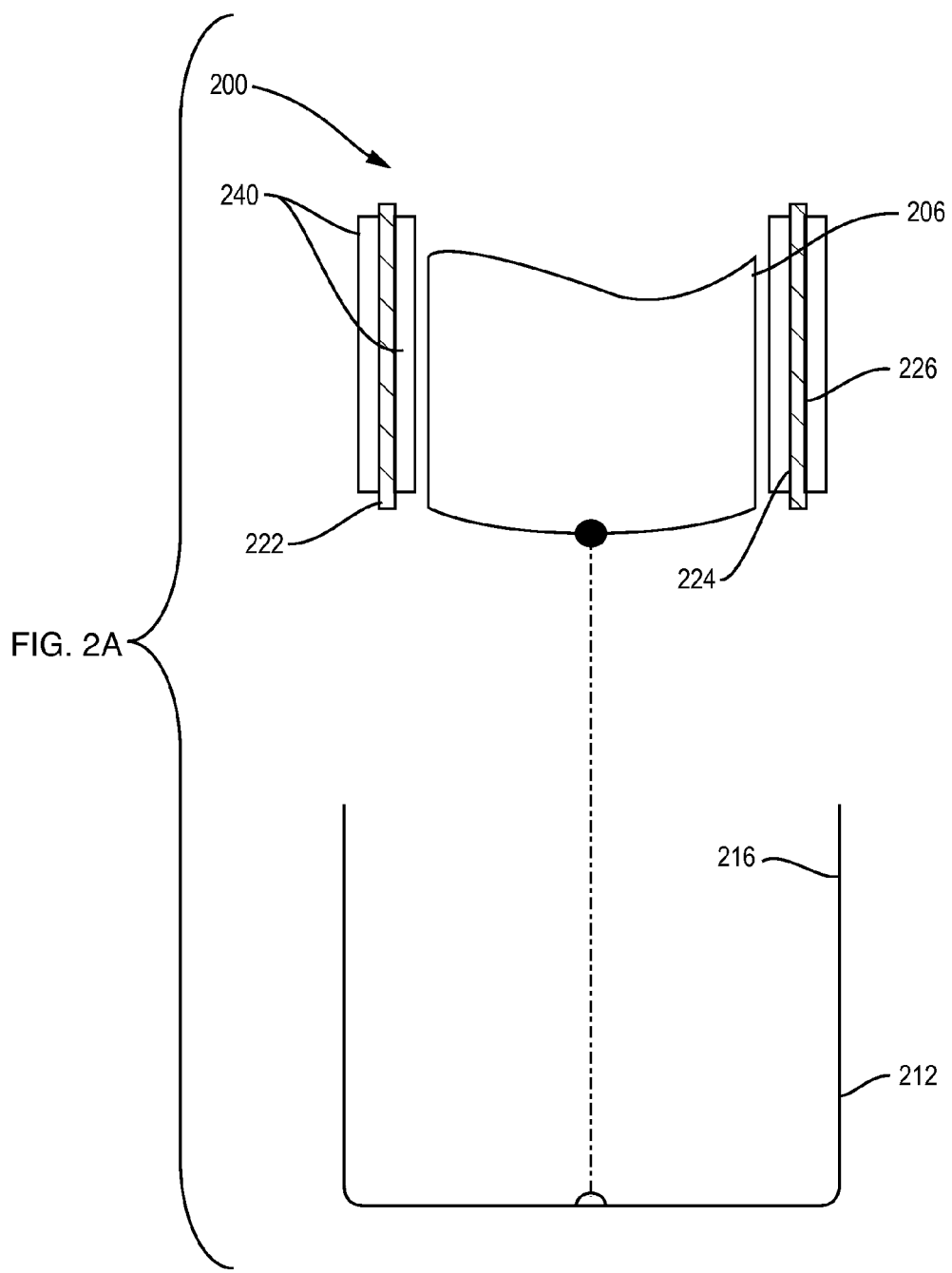

PERMANENT CONVERSION ADAPTER FOR LIGHTING FIXTURES

TECHNICAL FIELD

In various embodiments, the invention relates to adapters for lighting fixtures, and in particular to adapters that convert conventional fixtures to accommodate light-emitting diode (LED) lights.

BACKGROUND

Organizations promoting energy efficiency often provide financial incentives to property owners for conversion from incandescent lighting sources to LEDs. Unfortunately, some property owners have been known to make the replacements, claim the financial incentive, and then revert to incandescent lighting; indeed, unscrupulous property owners may return the LEDs for a refund after falsely claiming the financial incentive.

Some property owners leave the newly installed LEDs in place but revert to incandescent lighting when the LEDs wear out, because replacement LEDs can be relatively expensive. A permanently installed LED would solve this problem, but could not be replaced upon failure. Accordingly, there is a need for an LED adapter that permanently converts incandescent fixtures so they accept only LEDs, but allows replacement of an LED upon failure thereof.

SUMMARY OF THE INVENTION

In various embodiments, the present invention features an adapter that, once installed in a receptacle for an incandescent lighting source, cannot be removed therefrom. This is generally achieved by surrounding at least a portion of the outer surface of the adapter with an activatable bonding agent. The adapter is installed in a conventional receptacle and the bonding agent is activated. The bonding agent thereupon adheres to the adjacent surfaces substantially permanently, thereby affixing the adapter to the conventional receptacle. The adapter generally includes an LED receptacle for removably receiving an LED. Because the adapter is affixed substantially permanently to the conventional receptacle, an incandescent light source cannot be installed therein.

In addition, a power converter/limiter is also installed in the adapter to condition the A/C mains power received by the conventional receptacle into power suitable for use by the LED. The conditioned power is generally unsuitable and/or inadequate for use by an incandescent light source, and hence, it may not be feasible to install such a light source in the adapter. Therefore, once the adapter is installed in an existing receptacle, it can only receive LEDs-based lamps.

Accordingly, in a first aspect, the invention relates to an adapter permanently affixable within a conventional receptacle for incandescent bulbs. In various embodiments, the adapter comprises a receptacle for an LED; an outer conductive surface receivable into the conventional receptacle for electrical coupling thereto; and a bonding agent surrounding at least a portion of the outer conductive surface and activatable to permanently retain the adapter within the conventional receptacle substantially without disrupting electrical coupling between the adapter and the conventional receptacle. (The terms LED, LED lamp, or LED module are used interchangeably herein to connote any LED-based lighting component receivable in a receptacle.)

The conventional receptacle and the outer conductive surface may be threaded. Various embodiments further comprise circuitry for converting or limiting power delivered from the conventional receptacle to a power suitable for driving an LED received in the LED receptacle.

In some embodiments, the bonding agent comprises or consists essentially of a solder or other metallic bonding agent. For example, the bonding agent may comprise at least one layer of foil comprising intermixed metal layers, where the solder is in contact with the foil. The solder may, for example, be activated by electricity, and may take the form of a wire.

In other embodiments, the bonding agent is activatable by actinic radiation, e.g., ultraviolet or visible-light radiation. For example, the bonding agent may comprise an ultraviolet- or visible light-curable adhesive. In such cases, at least a portion of the outer conductive surface may be transparent. The adapter may, for example, be sufficiently transparent to facilitate curing of the adhesive by an external source of radiation. Alternatively, the outer conductive surface may be at least partially transparent, so that the adapter provides a substantially transparent light path to the outer conductive surface from a surface exposed when the adapter is received within the conventional receptacle.

In another aspect, the invention relates to a method of permanently affixing an adapter within a conventional receptacle for incandescent bulbs. In various embodiments, the method comprises the steps of providing an adapter comprising (i) a receptacle for an LED, (ii) an outer conductive surface receivable into the conventional receptacle, and (iii) an activatable bonding agent surrounding at least a portion of the outer conductive surface; receiving the adapter in the conventional receptacle so that the outer conductive surface electrically couples to a surface of the conventional receptacle; and activating the bonding agent to permanently retain the adapter within the conventional receptacle substantially without disrupting electrical coupling between the adapter and the conventional receptacle.

In some embodiments, the activatable bonding agent is solder placed substantially in contact with the outer conductive surface. The activatable bonding agent may for example, be a solder wire wrapped around the outer conductive surface substantially in contact therewith. Alternatively, the activatable bonding agent may comprise or consist of a foil comprising intermixed metal layers around the outer conductive surface; the foil may be chemically deposited or mechanically affixed. In still other embodiments, solder is placed substantially in contact with the foil. Activating the bonding agent may, for example, comprise causing flow of electricity therethrough—e.g., by exposing the bonding agent to electromagnetic radiation sufficient to induce a current in the bonding agent. Alternatively, activating the bonding agent may comprise turning on an LED received in the LED receptacle, whereby an electric current flowing through the LED also flows through the bonding agent. In still other embodiments, the adhesive is a conventional glue, e.g., an RTV (moisture cure) silicone formulation.

In still other embodiments, activating the bonding agent comprises exposing it to actinic radiation, e.g., ultraviolet or visible-light radiation. For example, activating the bonding agent may comprises turning on an LED received in the LED receptacle, and exposing the bonding agent to actinic radiation from the LED. The receptacle may be configured so that it will not work—i.e., power (or sufficient power) will not be provided to the LED—unless bonding has been achieved. The bonding agent may include a visible indication of a suitable bond, or may interact with the LED to produce such a visible indication (e.g., a green light to indicate a proper bond and a red light to indicate a faulty permanent bond.

In some embodiments, the receptacle includes circuitry for conditioning the voltage or limiting the power that can be drawn from the receptacle.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and in some embodiments, ±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 2A-2C show cross-sectional views of another adapter and bonding of the adapter to a conventional receptacle for incandescent light sources.

DESCRIPTION

Figure 1:
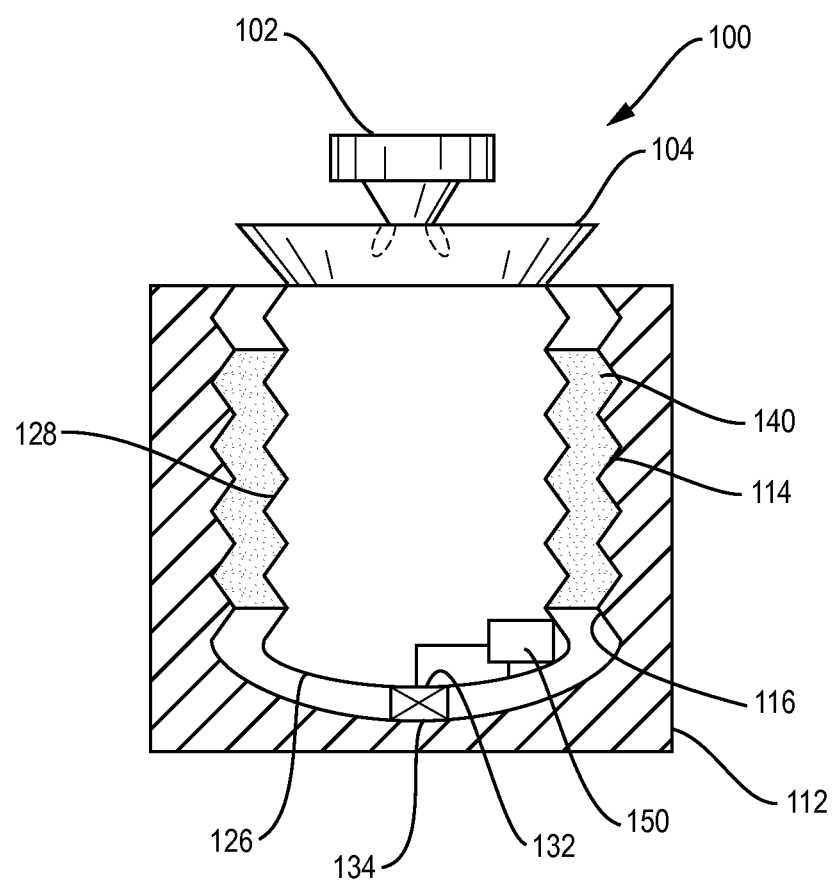
FIG. 1 shows a cross-sectional view of an exemplary adapter.

In the exemplary adapter 100 shown in FIG. 1, an LED or LED-based lamp 102 can be received into a LED receptacle 104. The adapter 100 can be received in a conventional receptacle 112 for light bulbs (e.g., an Edison base socket). FIG. 1 shows a threaded portion 114 of the inner surface 116 of the conventional receptacle 112. The outer surface 126 of adapter 100 also includes a threaded portion 128 so that adapter 100 can be screwed into the conventional receptacle 112. It should be understood however, that an adapter having a threaded outer surface is illustrative only, and that adapters having an unthreaded surface or mating features such as pins or bumps (e.g., GU10, MR16 sockets) are within the scope of the present invention. The outer surface 126 of adapter 100 is conductive, i.e., it may comprise or consist essentially of a conductive metal or metal alloy (e.g., copper, silver, aluminum, etc.). Once received in the conventional receptacle 112, the outer surface 126 of adapter 100 is in contact with the inner surface 116 of receptacle 112.

The adapter 100 has an electrical contact 132 that is electrically coupled to a base contact 134 of the conventional receptacle 112 when the adapter 100 is installed therein. The electrical contact 132 is electrically isolated from the outer conductive surface 126 of adapter 100. Such isolation can be achieved by surrounding the electrical contact 132 with an insulation material (e.g., plastic, ceramic, etc.) (not shown) so that the electrical contact 132 is not in direct physical contact with the outer conductive surface 126. Alternatively or in addition, the electrical contact 132 can include an inner conductive portion and an outer non-conductive portion for insulation.

FIG. 1 also shows solder 140 that is activated, i.e., melted so that a substantially permanent bond is formed between the outer surface 126 of adapter 100 and the inner surface 116 of the receptacle 112 when the solder 140 resolidifies. As a result, receptacle 112 can no longer receive an incandescent light bulb. The LED 102, however, can be removed from the LED receptacle 104 and replaced. The activation of solder 140 is described below with reference to FIGS. 2A-2C.

A power converter/limiter 150 may be included in the adapter 100 and, if included, is connected to the electrical contact 132 and the outer conductive surface 126 of the adapter 100. After the adapter 100 is installed within the conventional receptacle 112, the power converter/limiter 150 receives the electric power supplied to the conventional receptacle 112 (e.g., AC line voltage) and converts it into a type of power suitable for the operation of the LED 102 (e.g., 12 V DC), and may also limit the total power consumption to eliminate the user's ability to modify a higher-power device for installation into the adapter. The power converter/limiter 150 provides the converted and/or conditioned power to the LED 102. The power converter/limiter 150 may, for example, be a solid-state transformer and/or a AC-DC rectifier, and may also contain a power- or current-limiting element.

In some situations, a user may replace the LED 102 with a relatively inexpensive light source receivable in the adapter 100 that consumes substantially more power than the LED 102. This would eliminate or mitigate the low-power-consumption benefits of using an LED. In order to deter such a replacement, in some embodiments the total power output by the power converter/limiter 150 is limited to a predetermined threshold (e.g., the power required by the LED 102). Thus, another light source requiring substantially more power may not be received in the adapter 100.

Figure 2B:
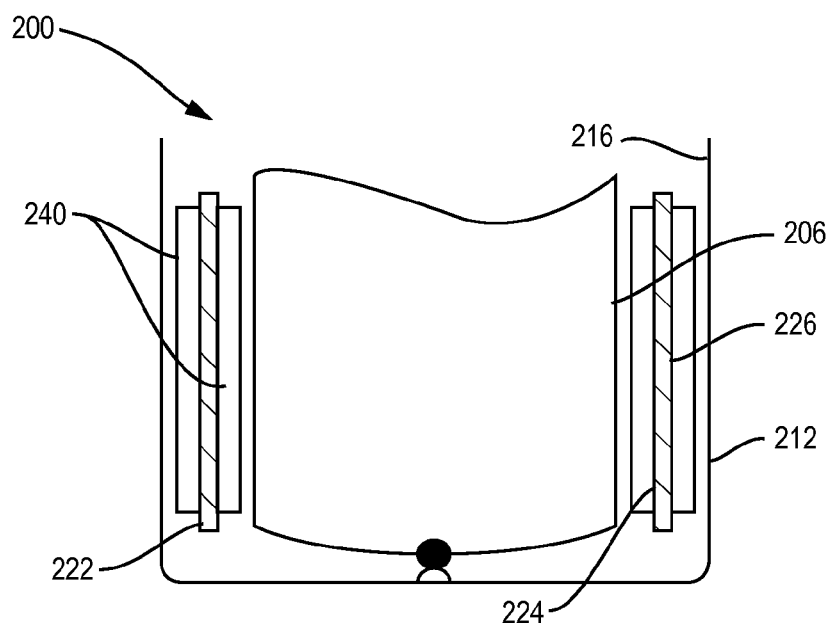
Figure 2C:
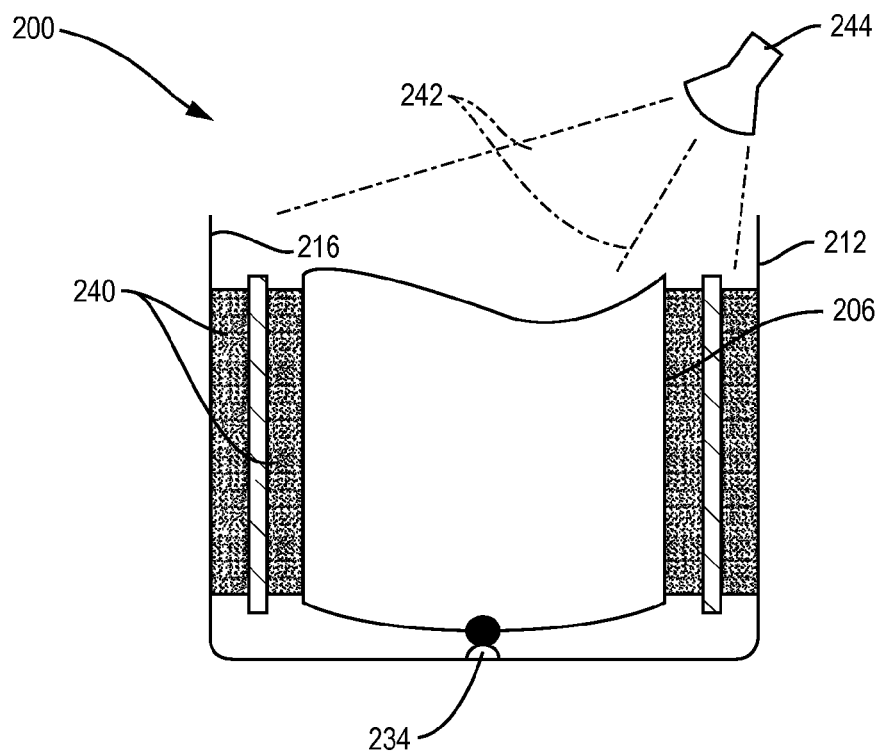

Bonding of an adapter embodiment 200 within a conventional receptacle 212 is illustrated in FIGS. 2A-2C. FIG. 2A shows a portion of the outer surface 206 of the adapter 200 and the inner surface 216 of a receptacle 212. in this embodiment, surfaces 206, 216 are smooth, and surface 206 is surrounded by a foil 222. The foil may comprise or consist essentially of intermixed metal layers (e.g., layers of aluminum and nickel). The foil may be chemically deposited to the surface or mechanically applied. Solder 240 sandwiches the foil 222, i.e., is in contact with the inner and outer surfaces, 224, 226 of foil 222. Solder 240 can be applied to both sides of foil 222 using known methods such as, for example, coating or electrochemical deposition. Solder 240 can also take the form of a wire or band or a pattern of beads in contact with the surfaces 224, 226. Adapter 200 can be supplied with foil 222 wrapped around its outer surface 206.

FIG. 2B shows adapter 200 received within receptacle 212. As a result, foil 222 and solder 240 intervene between the outer surface 206 of adapter 200 and the inner surface 216 of receptacle 212. FIG. 2B shows that solder 240 is not activated (i.e., not melted and, hence, not bonded to either surface 206 or surface 216). Therefore, adapter 200 can be removed from the conventional receptacle 212.

As shown in FIG. 2C, the foil 222 and solder 240 may be activated by a current flow that occurs when electricity is supplied to the conventional receptacle 212 for the first time following introduction of adapter 200 therein. Specifically, when a line voltage is applied between the inner surface 216 and the base contact 234, the conversion circuitry converts the line voltage to power the LED, and current flows through foil 222 and solder 240. This current flow can activate foil 222 and solder 240. In particular, the current flow causes foil 222 to release sufficient heat to melt the solder. Releasing heat in response to current flow is an inherent property of a foil having intermixed metal layers.

The solder 240 surrounding foil 222 melts and bonds with surfaces 206, 216 as it cools and solidifies; the foil 222 may disintegrate or dissolve into solder 240. As a result, adapter 200 is substantially permanently affixed to the conventional receptacle 212, and receptacle 212 can no longer receive an incandescent light bulb.

The foil 222 and solder 240 can be activated alternatively or additionally by radiation of energy 242. Radiation 242 can be provided by a source 244 of radiation positioned proximate to the surface 206 of adapter 200. For example, source 244 can be a microwave emitter, radiating electromagnetic energy that induces Eddy currents in foil 222, causing it to release heat and thereby activate solder 240. The source of radiation 244 can alternatively be a laser emitter, or a separate electrical power supply.

Figure 3:
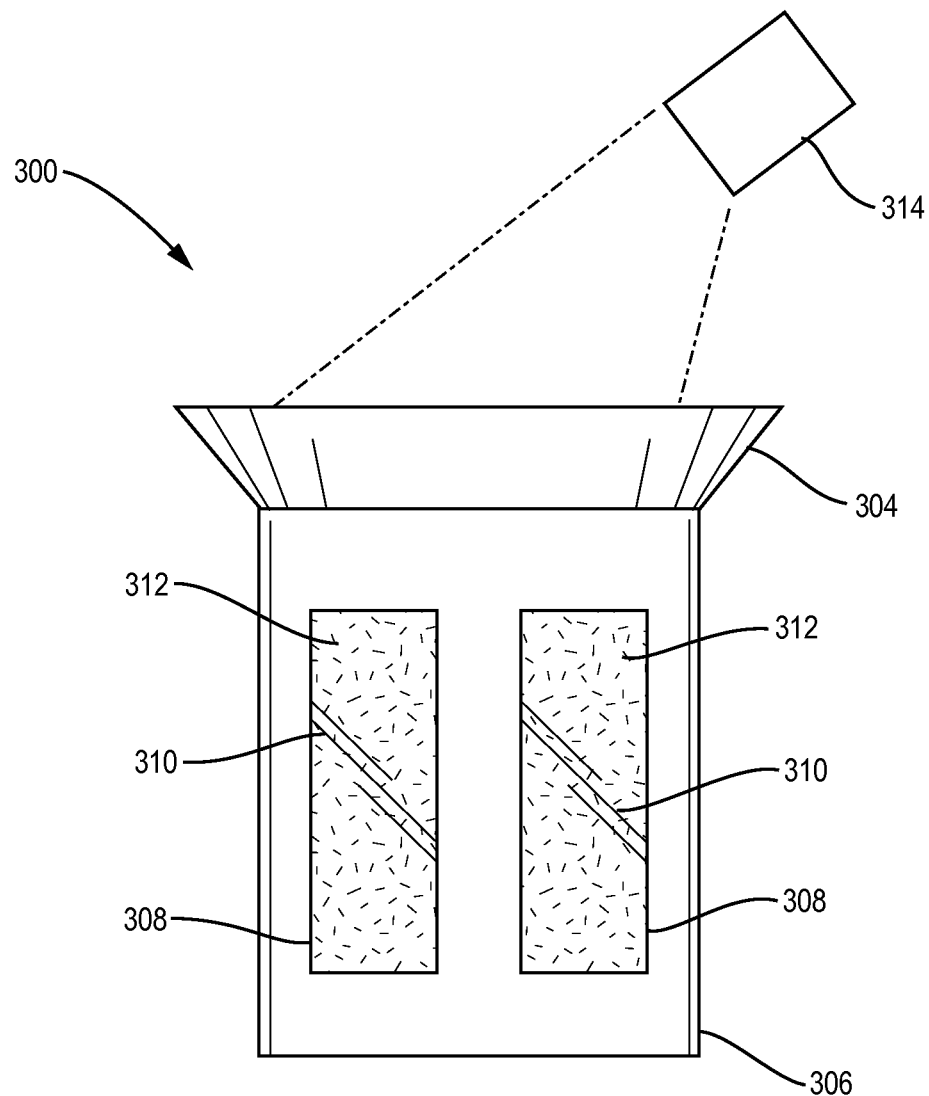
FIG. 3 shows an elevational view of another adapter using UV-curable epoxy as a bonding agent.

Permanent bonding agents other than solder can be employed. For example, as shown in FIG. 3, a UV- or visible light-curable epoxy can be used as a bonding agent. The adapter 300 has an LED receptacle 304 and a conducting outer surface 306 through which one or more windows 308 provide a line of sight. Although surface 306 is shown two rectangular windows 308, fewer (i.e., only one) or more windows circumferentially distributed around receptacle 304, and windows of different shapes and sizes (e.g., circle, oval, square, etc.) are within the scope of the present invention. Windows 308 can be formed by cutting out portions of surface 306 or by punching or drilling holes in surface 306.

Windows 308 may be fitted with flexible transparent panes 310. Such panes can be formed using a material sufficiently transparent to allows passage of UV or visible light. Examples of such materials include clear plastic (e.g., polycarbonate). Transparent panes 310 are affixed within the windows 308 substantially permanently using methods such as gluing, clamping, riveting, etc. The conducting outer surface 306, fitted with window panes 310, can be threaded so that it may be screwed into a conventional incandescent receptacle. A layer 312 of a UV- or visible-light-curable epoxy is positioned in direct contact with the outer surface of window panes 310. For example, window panes 310 can be coated with the curable epoxy. For a threaded adapter 300, the epoxy may be applied as a bead in the spiral trough of the threads.

The adapter 300 can be received in a conventional receptacle. Initially, the epoxy layer 312 is not bonded to, but is in contact with, the adjacent inner surface of the conventional adapter. The conductive outer surface 306 of adapter 300 is in electrical contact with the inner surface of the conventional receptacle. For example, if the epoxy is only within the trough of the adapter threads, or is applied in a spiral or striped pattern around the outer adapter surface 306, areas of direct mechanical contact between the outer surface 306 and the inner surface of the receptacle remain (where the epoxy is not present and does not intervene).

When the optical radiation emitted from an optical source 314 positioned above the LED receptacle 304 is directed inside the adapter 300, the light propagates through the transparent windows 308 and activates—i.e., causes cross-linking of—the UV or visible light-curable epoxy layer 312. As a result, the adapter 300 is substantially permanently bonded to the conventional receptacle, while allowing the epoxy-free portions of conductive outer surface 306 to maintain electrical contact with the inner surface of the conventional receptacle. As a result, an LED can be received in and removed from the LED receptacle 304 of adapter 300, but the adapter itself cannot be removed.

Figure 4:
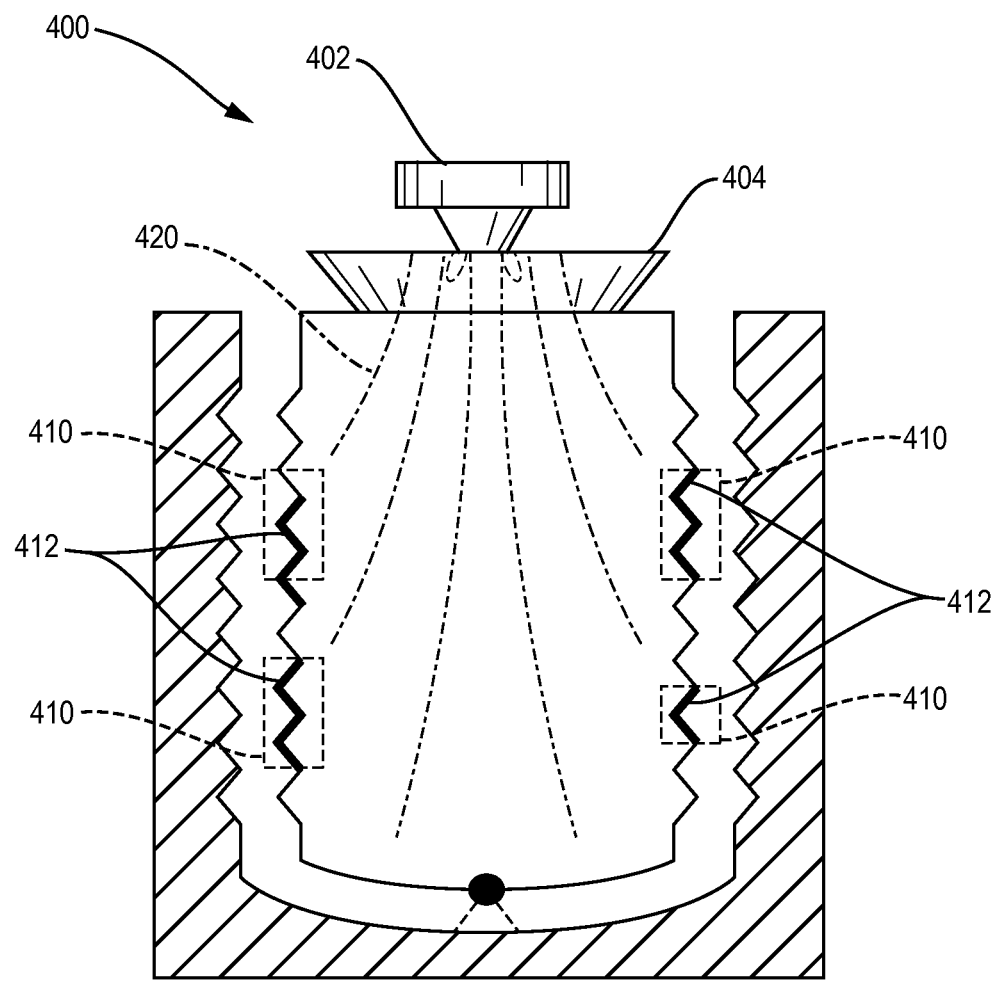
FIG. 4 shows a cross-sectional view of an adapter received in a conventional receptacle.

In the embodiment illustrated in FIG. 3, the adapter 300 is typically exposed to a source 314 before receiving an LED in the LED receptacle 304 so that the light from the source 314 can be directed, without obstruction, inside the adapter 300. Alternatively, in the adapter embodiment 400 shown in FIG. 4, a UV LED 402 is received in the LED receptacle 404. When the LED is turned on for the first time, UV radiation 420 therefrom exposes the epoxy layers 412. Areas of the threaded portion may be fitted with flexible transparent regions 410 to permit transmission of UV radiation.

Although a UV-curable epoxy may be used as a bonding agent in adapters 300, 400, and a UV source used to activate the epoxy, it should be understood that any adhesive crosslinked by actinic radiation is suitable. Other examples include UV-curable acrylic or methacrylic polymers combined with a tackifying resin and a photoinitiator, Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. An adapter permanently affixable within a receptacle for incandescent bulbs, the adapter comprising:
   a receptacle for an LED;
   an outer conductive surface receivable into the receptacle for electrical coupling thereto; and
   a bonding agent surrounding at least a portion of the outer conductive surface and activatable to permanently retain the adapter within the receptacle substantially without disrupting electrical coupling between the adapter and the receptacle.

2. The adapter of claim 1, wherein the receptacle and the outer conductive surface are threaded.

3. The adapter of claim 1, further comprising circuitry for converting a voltage received from the receptacle to a voltage for driving an LED received in the LED receptacle.

4. The adapter of claim 3, wherein the conversion circuitry limits an amount of power deliverable to the LED.

5. The adapter of claim 1, wherein the bonding agent comprises or consists essentially of a solder.

6. The adapter of claim 5, wherein the bonding agent further comprises at least one layer of foil comprising intermixed metal layers, the solder being in contact with the foil.

7. The adapter of claim 5, wherein the solder is activated by electricity.

8. The adapter of claim 5, wherein the solder is in the form of a wire.

9. The adapter of claim 1, wherein the bonding agent is activatable by actinic radiation.

10. The adapter of claim 1, wherein the actinic radiation is ultraviolet or visible-light radiation.

11. The adapter of claim 1, wherein the bonding agent comprises an ultraviolet- or visible light-curable adhesive.

12. The adapter of claim 11, wherein at least a portion of the outer conductive surface is transparent.

13. The adapter of claim 12, wherein the adapter is sufficiently transparent to facilitate curing of the adhesive by an external source of radiation.

14. The adapter of claim 13, wherein the outer conductive surface is at least partially transparent, the adapter providing a substantially transparent light path to the outer conductive surface from a surface exposed when the adapter is received within the receptacle.

15. The adapter of claim 1, wherein the receptacle is an Edison base socket.

16. A method of permanently affixing an adapter within a receptacle for incandescent bulbs, the method comprising the steps of providing an adapter comprising (i) a receptacle for an LED, (ii) an outer conductive surface receivable into the receptacle, and (iii) an activatable bonding agent surrounding at least a portion of the outer conductive surface;

receiving the adapter in the receptacle so that the outer conductive surface electrically couples to a surface of the receptacle; and activating the bonding agent to permanently retain the adapter within the receptacle substantially without disrupting electrical coupling between the adapter and the receptacle.

17. The method of claim 16, wherein the activatable bonding agent is solder placed substantially in contact with the outer conductive surface.

18. The method of claim 16, wherein providing the activatable bonding agent is a solder wire wrapped around the outer conductive surface substantially in contact therewith.

19. The method of claim 16, wherein the activatable bonding agent comprises a foil comprising intermixed metal layers and wrapped around the outer conductive surface.

20. The method of claim 19, further comprising chemically depositing the foil on the outer conductive surface.

21. The method of claim 19, further comprising mechanically affixing the foil to the outer conductive surface.

22. The method of claim 19, further comprising placing solder substantially in contact with the foil.

23. The method of claim 16, wherein activating the bonding agent comprises causing flow of electricity therethrough.

24. The method of claim 16, wherein activating the bonding agent comprises turning on an LED received in the LED receptacle, whereby an electric current flowing through the LED also flows through the bonding agent.

25. The method of claim 16, further comprising converting a power signal received from the receptacle to a power signal for driving an LED source received in the LED receptacle.

26. The method of claim 25, further comprising limiting an amount of power of the power signal to a predetermined threshold.

27. The method of claim 16, wherein the receptacle is an Edison base socket.

* * * * *